(12) United States Patent
Hanes et al.

(10) Patent No.: US 9,747,192 B2
(45) Date of Patent: *Aug. 29, 2017

(54) AUTOMATED OPERATING SYSTEM INSTALLATION ON MULTIPLE DRIVES

(71) Applicant: American Megatrends, Inc., Norcross, GA (US)

(72) Inventors: Charles Patrick Hanes, Hoschton, GA (US); Eschol Leonard Jones, IV, Lilburn, GA (US); Hoang Ngoc Minh Vu, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/878,414

(22) Filed: Oct. 8, 2015

(65) Prior Publication Data

US 2016/0026451 A1    Jan. 28, 2016

Related U.S. Application Data

(63) Continuation of application No. 14/056,653, filed on Oct. 17, 2013, now Pat. No. 9,158,662.

(51) Int. Cl.
*G06F 3/06* (2006.01)
*G06F 11/36* (2006.01)
*G06F 9/445* (2006.01)

(52) U.S. Cl.
CPC ........ *G06F 11/3664* (2013.01); *G06F 3/0605* (2013.01); *G06F 8/61* (2013.01)

(58) Field of Classification Search
CPC ....... G06F 9/45558; G06F 2009/45562; G06F 8/61; G06F 8/63; G06F 3/0605; G06F 11/3554; G06F 11/1402
See application file for complete search history.

(56) References Cited

U.S. PATENT DOCUMENTS 5,325,377 A    6/1994 Tuttle
5,410,551 A    4/1995 Edwards et al.
(Continued)

OTHER PUBLICATIONS

Jeremic et al., Operating system support for dynamic over-provisioning of solid state drives, Mar. 2012, 6 pages.*
(Continued)

*Primary Examiner* — Thuy Dao
(74) *Attorney, Agent, or Firm* — Lee & Hayes, PLLC

(57) ABSTRACT

Technologies are provided herein for automated operating system installation on multiple drives. A device switch connects a mass storage device to a test control system ("TCS") or a system under test ("SUT"). When connected to the TCS, the mass storage device is mounted with a disk image containing an installer program for an operating system. When the mass storage device is connected to the SUT, the installer program is executed to install the operating system onto an activated drive connected to the SUT. Multiple operating systems can be installed in a similar fashion by mounting a corresponding disk image for an operating system onto the mass storage device and by installing from the mass storage device the operating system onto a corresponding drive connected to the SUT. Errors generated during the automated installation process can be analyzed and utilized to identify and correct errors in a computing system firmware.

20 Claims, 7 Drawing Sheets

(56) References Cited

U.S. PATENT DOCUMENTS

| | | | |
|---|---|---|---|
| 5,581,740 A | 12/1996 | Jones | |
| 6,016,400 A * | 1/2000 | Day | G06F 8/61 |
| | | | 713/2 |
| 6,094,531 A | 7/2000 | Allison et al. | |
| 6,178,503 B1 | 1/2001 | Madden et al. | |
| 6,351,850 B1 * | 2/2002 | van Gilluwe | G06F 8/61 |
| | | | 707/999.202 |
| 6,418,532 B2 | 7/2002 | Redford et al. | |
| 6,532,538 B1 | 3/2003 | Cronk et al. | |
| 6,543,047 B1 | 4/2003 | Vrhel, Jr. et al. | |
| 6,618,857 B1 | 9/2003 | Zimniewicz et al. | |
| 6,871,244 B1 | 3/2005 | Cahill et al. | |
| 7,039,836 B2 | 5/2006 | Powers et al. | |
| 7,206,832 B2 | 4/2007 | Matsunami et al. | |
| 7,290,258 B2 | 10/2007 | Steeb et al. | |
| 7,356,677 B1 | 4/2008 | Rafizadeh | |
| 7,370,104 B2 | 5/2008 | Matsunami et al. | |
| 7,444,502 B2 | 10/2008 | Hatasaki et al. | |
| 7,467,283 B2 | 12/2008 | Loffink et al. | |
| 7,614,050 B2 | 11/2009 | Sasaki et al. | |
| 7,950,008 B2 * | 5/2011 | Bhide | G06F 8/61 |
| | | | 717/174 |
| 8,266,418 B2 | 9/2012 | Yun | |
| 8,266,615 B2 * | 9/2012 | Shapiro | G06F 8/61 |
| | | | 717/169 |
| 8,370,835 B2 * | 2/2013 | Dittmer | G06F 9/45558 |
| | | | 711/115 |
| 8,495,626 B1 | 7/2013 | Hanes et al. | |
| 8,930,666 B1 | 1/2015 | Richardson et al. | |
| 8,997,090 B2 * | 3/2015 | Xu | G06F 8/61 |
| | | | 717/174 |
| 9,025,366 B2 * | 5/2015 | Park | G06F 13/00 |
| | | | 365/158 |
| 9,052,940 B2 * | 6/2015 | Chieu | G06F 9/45558 |
| 9,116,633 B2 * | 8/2015 | Sancheti | G06F 3/065 |
| 9,116,743 B2 * | 8/2015 | Suzuki | G06F 9/4856 |
| 9,158,662 B1 * | 10/2015 | Hanes | G06F 11/3664 |
| 9,424,017 B2 * | 8/2016 | Macken | G06F 8/61 |
| 9,436,555 B2 * | 9/2016 | Dornemann | G06F 11/1471 |
| 9,448,834 B2 * | 9/2016 | Martos | G06F 11/1469 |
| 9,542,304 B1 | 1/2017 | Hanes et al. | |
| 2001/0012986 A1 | 8/2001 | Conan et al. | |
| 2004/0098244 A1 | 5/2004 | Dailey et al. | |
| 2004/0117414 A1 | 6/2004 | Braun et al. | |
| 2004/0194084 A1 | 9/2004 | Matsunami et al. | |
| 2004/0210888 A1 | 10/2004 | Bergen et al. | |
| 2004/0267482 A1 | 12/2004 | Robertson et al. | |
| 2005/0149682 A1 | 7/2005 | Kim | |
| 2005/0216481 A1 | 9/2005 | Crowther et al. | |
| 2006/0013100 A1 | 1/2006 | Ho | |
| 2006/0047946 A1 | 3/2006 | Keith, Jr. | |
| 2006/0129797 A1 | 6/2006 | Durfee et al. | |
| 2006/0174049 A1 | 8/2006 | Lin et al. | |
| 2006/0251087 A1 | 11/2006 | Ng et al. | |
| 2007/0050750 A1 | 3/2007 | Bykov et al. | |
| 2007/0239861 A1 | 10/2007 | Reeves et al. | |
| 2008/0010631 A1 | 1/2008 | Harvey et al. | |
| 2008/0120613 A1 | 5/2008 | Dandekar et al. | |
| 2008/0126773 A1 | 5/2008 | Martinez et al. | |
| 2008/0134171 A1 | 6/2008 | Matsunami et al. | |
| 2008/0141242 A1 | 6/2008 | Shapiro | |
| 2008/0189398 A1 | 8/2008 | Solyanik | |
| 2008/0256219 A1 | 10/2008 | Zhang et al. | |
| 2008/0270608 A1 | 10/2008 | Matsunami et al. | |
| 2008/0320071 A1 | 12/2008 | Hoskins et al. | |
| 2009/0019211 A1 | 1/2009 | Bandholz et al. | |
| 2009/0063765 A1 | 3/2009 | Kottomtharayil et al. | |
| 2009/0083375 A1 | 3/2009 | Chong et al. | |
| 2009/0199193 A1 | 8/2009 | Jackson | |
| 2009/0307477 A1 | 12/2009 | Matthew et al. | |
| 2009/0307763 A1 | 12/2009 | Rawlins et al. | |
| 2010/0192145 A1 | 7/2010 | Liles et al. | |
| 2011/0004872 A1 | 1/2011 | Eromenko et al. | |
| 2011/0072256 A1 | 3/2011 | Arafeh | |
| 2015/0220322 A1 * | 8/2015 | Brown | G06F 8/61 |
| | | | 717/168 |
| 2016/0098288 A1 * | 4/2016 | Petrov | G06F 8/61 |
| | | | 718/1 |

OTHER PUBLICATIONS

Vaupel et al., Operating systems development: driving forces, critical steps, decision processes, Jun. 2012, 4 pages.*

Forrest et al., Virtualization and its effect on operating system, Mar. 2011, 2 pages.*

Yang et al., Safe to the last instruction: automated verification of a type-safe operating system, Jun. 2010, 12 pages.*

El Torito (CD-Rom standard), Wikipedia, Accessed May 22, 2013, First issued in Jan. 1995 as a joint proposal by IBM and BIOS Manufacturer Pheonix Technologies, 2 pages.

Hackman et al., "Meet 'Facet' the RealNetworks DVD Ripper Box," Apr. 28, 2009, publisher: PCMAG.com, 1 page.

Kook et al., "An Efficient Checkpoint Scheme for the Fast Mount of Flash File System", RACS'11, 2011 3 pages.

Office Action from the U.S. Patent and Trademark Office for U.S. Appl. No. 12/814,873 dated Jan. 31, 2014, 16 pages.

Office Action from the U.S. Patent and Trademark Office for U.S. Appl. No. 13/948,659 dated Oct. 29, 2014, 14 pages.

Office Action from the U.S. Patent and Trademark Office for U.S. Appl. No. 12/575,825 dated Nov. 5, 2012, 9 pages.

Office Action from the U.S. Patent and Trademark Office for U.S. Appl. No. 12/814,873 dated Dec. 22, 2011, 10 pages.

Office Action from the U.S. Patent and Trademark Office for U.S. Appl. No. 12/814,873 dated Dec. 6, 2012, 11 pages.

Office Action from the U.S. Patent and Trademark Office for U.S. Appl. No. 12/814,873 dated Mar. 29, 2013, 13 pages.

Office Action from the U.S. Patent and Trademark Office for U.S. Appl. No. 13/948,659 dated Apr. 27, 2016, 18 pages.

Office Action from the U.S. Patent and Trademark Office for U.S. Appl. No. 12/575,825 dated Jun. 5, 2012, 21 pages.

Office Action from the U.S. Patent and Trademark Office for U.S. Appl. No. 12/814,873 dated Aug. 28, 2012, 12 pages.

Office Action from the U.S. Patent and Trademark Office for U.S. Appl. No. 12/814,873 dated Aug. 30, 2013, 15 pages.

Somani et al., "VMBooter: A Specialized Virtual Machine Boot Servier in An Infrastructure Cloud", ICONIAAC'14, 2014, 8 pages.

TeraCart Multimedia Storage System-Bluray Disc, Ascaca Shibasouku Corporation of America, broshure, 2007, 1 page.

Virtual CD-ROM Control Panel 2.0.11, Softpedia, Accessed Jun. 4, 2010 from http://www.softpedia.com/get/CD-DVD-Tools/Virtual-DVD-Rim/Virtual-CDROM-C . . . , 1 page.

* cited by examiner

AUTOMATED OPERATING SYSTEM INSTALLATION ON MULTIPLE DRIVES

CROSS REFERENCE TO RELATED APPLICATIONS

This application is a continuation of U.S. patent application Ser. No. 14/056,653, entitled "AUTOMATED OPERATING SYSTEM INSTALLATION ON MULTIPLE DRIVES," filed on Oct. 17, 2013, now U.S. Pat. No. 9,158,662 issued on Oct. 13, 2015, which is expressly incorporated herein by reference in its entirety.

BACKGROUND

Most computing systems utilize firmware to control their low-level operation. In many computing systems, the firmware provides functionality for performing a power-on self-test ("POST") of the computing system, for performing an initial program load, or boot, of the computing system, for providing interfaces to the low-level operation of the computing system hardware to an operating system, and for performing other functions. Because the firmware controls the low-level operation of a computing system, it is imperative that the firmware operates without program errors, sometimes called "bugs." Because of the complexity of most computing system firmware, however, this type of software can be very difficult to test and debug.

One commonly used mechanism for testing the operation of a computing system firmware involves installing an operating system on a computer system under test ("SUT"). If errors are detected during the installation of the operating system, the errors can be utilized to identify bugs within the computing system firmware. This process is typically repeated for many different operating systems and, potentially, many different versions of the computing system firmware. There are cases where slight variations in task completion time, or other timing problems or delays could cause installations to fail. Therefore, it is also useful to test the identical operating system installation multiple times; something that might be referred to as "burn-in" testing. Because this testing process is typically performed manually by a human operator, however, this process can be extremely time consuming, costly, and prone to human errors due to the often repetitive nature of these tasks.

It is with respect to these and other considerations that the disclosure presented herein has been made.

SUMMARY

Technologies are provided herein for automated operating system installation on multiple drives. Through the concepts and technologies presented herein, the process of installing operating systems on a SUT can be automated, thereby permitting the unattended installation of the operating systems. Multiple operating systems can be installed on multiple drives and errors detected during the installations can be logged in an automated fashion, thereby reducing the cost of such testing.

According to one aspect presented herein, a test control system ("TCS") is provided that is configured with software for coordinating the automated installation of multiple operating systems on the SUT. In one embodiment, the TCS includes executable scripts for coordinating the automated installation of the operating systems. The TCS is connected to a device switch that includes functionality for connecting a mass storage device to either the SUT or the TCS. When the mass storage device is connected to the TCS, a disk image containing an installer program for an operating system to be installed on the SUT is mounted onto the mass storage.

In order to install an operating system on the SUT, the SUT is first configured to boot from an external mass storage device. Once the SUT has been so configured, the scripts executing on the TCS cause the device switch to connect the mass storage device to the SUT. The mass storage device has been mounted with a disk image that contains an installer program for a first operating system to be installed on the SUT. The TCS also causes a first drive to be activated and connected to the SUT, such as by powering on the first drive. The TCS then causes the SUT to power on, such as through the use of a power controller or a keyboard, video, and mouse over Internet protocol ("KVM/IP") redirection device. When the SUT boots up, the SUT then executes the installer program for the first operating system to install the first operating system on the first drive.

While the SUT is installing an operating system, the TCS receives screen displays (referred to herein simply as "screens") generated by the SUT from a KVM/IP redirection device connected to the SUT. The TCS then compares screens received from the SUT to previously generated and stored screens generated during an error-free installation of the operating system. Through the comparison process, the TCS can determine if an error has occurred during the installation of the operating system on the SUT. If an error occurs during installation, the TCS stores data identifying the error in an error log. A screen generated by the SUT at or around the time of the error may also be stored. In one embodiment, the TCS can also provide keystrokes to the SUT to facilitate the installation of an operating system. The keystrokes may be provided to the SUT through the use of a KVM/IP redirection device. An analysis of the received screens can be performed to determine when a particular key press should be provided to the SUT.

The TCS also compares screens received from the SUT to previously generated and stored screens to determine if the installation of the first operating system on the SUT has completed. If the installation has completed, the TCS causes the SUT to power off, causes the first drive to be deactivated, and causes the device switch to connect the mass storage device to the TCS. The TCS then mounts a second disk image containing an installer program for a second operating system onto the mass storage device. The TCS then causes the device switch to connect the mass storage device to the SUT, causes a second drive to be connected to the SUT and be activated, and causes the SUT to power on. When the SUT powers on, it executes the installer program for the second operating system to install the second operating system on the second drive. The SUT then monitors the installation of the second operating system in the manner presented above.

The process described above may then be repeated for any number of operating systems, thereby allowing multiple operating systems to be installed in an automated fashion. When all of the operating systems have been installed, a message may be generated and sent to an administrator, such as through an electronic mail, that includes the error log and screens showing any errors encountered during the installation of any of the operating systems.

It should be appreciated that the error log, screens, and operating system installations stored in one or more drives connected to the SUT may be utilized to debug the operation of a firmware executing on the SUT. For instance, bugs in the firmware may be identified through an analysis of the error log, screens generated by the SUT, or the operating system installations. Once a bug has been identified, an appropriate bug fix may be applied to the firmware. The tests described above may then be repeated on the revised firmware to determine if the problem has been resolved. It should be appreciated that other aspects of the SUT may be debugged and/or analyzed in a similar fashion.

It should also be appreciated that while the various embodiments presented herein are described in the context of the installation of an operating system, the concepts and technologies presented herein may be applied to monitoring the execution of any type of program code. It should be further appreciated that the above-described subject matter may also be implemented as a computing system, a computer-controlled apparatus, a computer process, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for automated operating system installation on multiple drives. In the following detailed description, references are made to the accompanying drawings that form a part hereof, and which are shown by way of exemplary embodiments and implementations. Note that although the subject matter presented herein has been described in conjunction with one or more particular embodiments and implementations, it is to be understood that the embodiments are not necessarily limited to the specific structure, configuration, or functionality described herein. Rather, the specific structure, configuration, and functionality described herein are disclosed as examples. Various modifications and changes may be made to the subject matter described herein without following the exemplary embodiments and applications illustrated and described, and without departing from the true spirit and scope of the embodiments disclosed herein.

Figure 1:
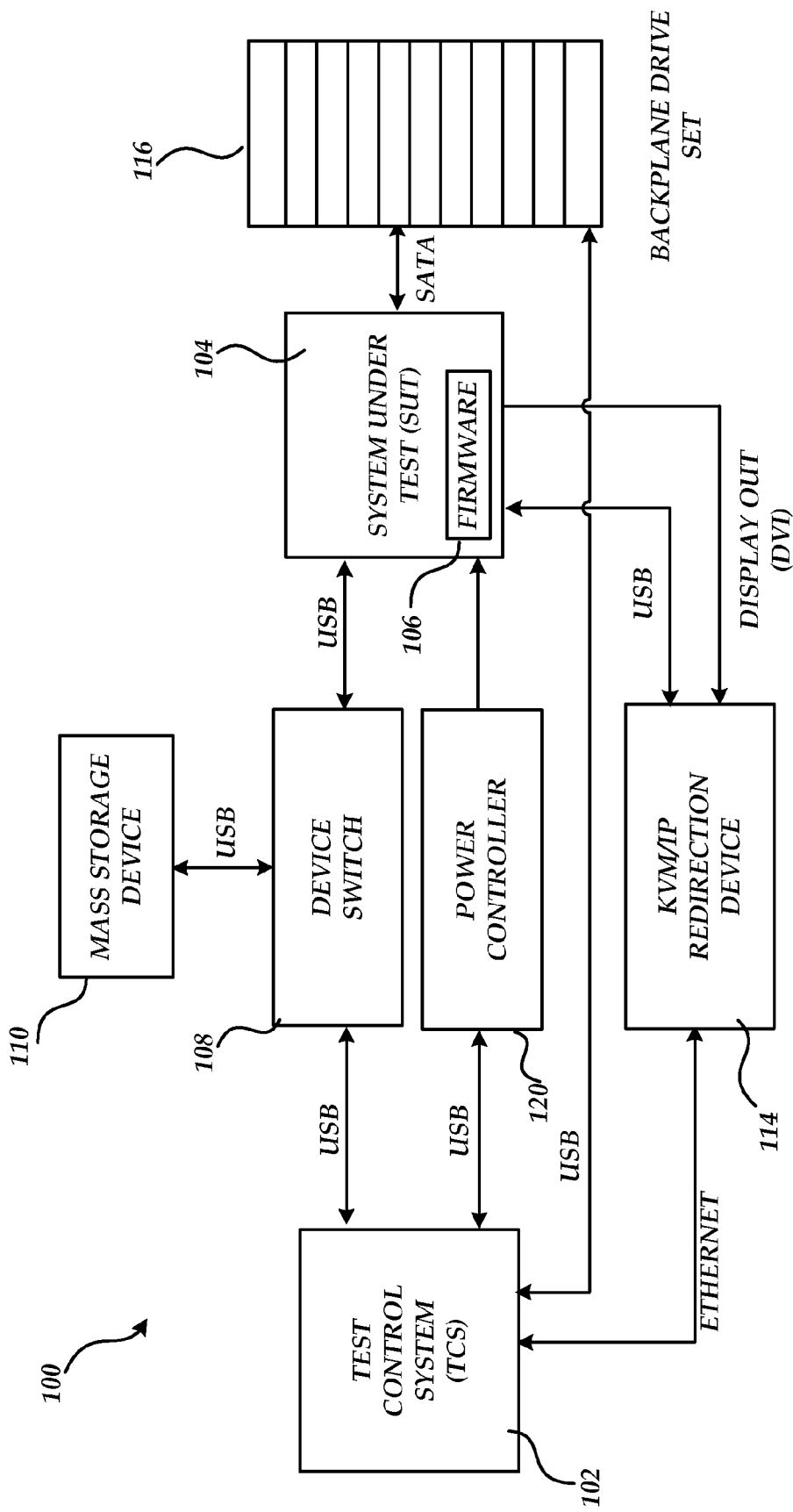
FIG. 1 is a system diagram showing aspects of a system provided in one embodiment for automated operating system installation.

FIG. 1 is a system diagram showing aspects of a system 100 provided in one embodiment for automated operating system installation. The system 100 shown in FIG. 1 includes a test control system ("TCS") 102. As will be described in detail herein, the TCS 102 is configured with executable program code for automating the installation of one or more operating systems on a system under test ("SUT") 104. Through the functionality provided by the TCS 102 according to the various embodiments presented herein, multiple operating systems may be installed on the SUT 104 in an automated fashion. Errors detected during the installation of the operating systems may be logged and utilized to debug a firmware 106 of the SUT 104. Additional details regarding this process and other processes disclosed herein will be provided below with respect to FIGS. 2-6.

In order to automate the installation of operating systems on the SUT 104, the TCS 102 operates in conjunction with a device switch 108. As illustrated in FIG. 1, the device switch 108 is connected to a mass storage device 110, the TCS and the SUT. According to implementations, the TCS 102 controls the device selector 108 for connecting the mass storage device 110 to either the SUT 104 or to the TCS 102. When the mass storage device 110 is connected to the TCS 102, the TCS 102 can select and mount a disk image containing an installer program for an operating system onto the mass storage device 110. As known in the art, a disk image is a single file containing the complete contents and structure of a data storage medium or device, such as a hard drive, tape drive, floppy disk, optical disk, or other type of device. A disk image is usually created by creating a complete sector-by-sector copy of the source medium, thereby replicating the structure and contents of a storage device. The disk images may be stored in any one of a number of standard disk image formats, such as the ISO disk image format, or another type of proprietary format. The mass storage device 110 may include hard disk drive, solid state mass storage device or any other mass storage device that is writable and can be created as a bootable device.

When the mass storage device 110 is connected to the SUT 104, the disk image stored on the mass storage device 110 can be exposed to the SUT 104 by way of a standard storage device. For example, the mass storage device 110 may be exposed to the SUT 104 as a virtual standard USB CD-ROM or DVD-ROM device. In this example, the disk image appears to the SUT 104 as a physical optical disk that has been inserted into a physically connected standard CD-ROM or DVD-ROM device, even though no actual CD or DVD-ROM device is connected and no physical optical disk is actually present. The installer program for the operating system contained in the mass storage device 110 may then be executed to install the operating system onto the SUT 104. In this manner, the TCS 102 can control the operating system to be installed onto the SUT 104 by mounting a disk image containing the corresponding operating system installer program onto the mass storage device 110.

According to one implementation, the TCS 102 also operates in conjunction with a power controller 120. As illustrated in FIG. 1, a connection is provided between the TCS 102 and the power controller 120. Another connection is also provided between the power controller 120 and the SUT 104. Through the appropriate connection, the TCS 102 can instruct the power controller 120 to power on or power off the SUT 104. In one implementation, the power controller 120 and the device switch 108 may be deployed on one board. Additional details regarding the use of the power controller 120 in the various embodiments presented herein for automating the installation of operating systems will be provided below with respect to FIGS. 2-6.

As shown in FIG. 1, the TCS 102 also utilizes a keyboard, video, mouse/internet protocol ("KVM/IP") redirection device 114. As illustrated in FIG. 1, a video display output of the SUT 104 is connected to the KVM/IP redirection device 114. Additionally, a connection is made between the KVM/IP redirection device 114 and the SUT 104 through which the KVM/IP redirection device 114 can send keyboard and mouse signals to the SUT 104. In one embodiment, this connection is a universal serial bus ("USB") connection. It should be appreciated, however, that other types of connections, such as a PS/2 mouse and keyboard connector may be utilized. The KVM/IP redirection device 114 is also connected to the TCS 102 through an appropriate network connection, such as an Ethernet connection.

As known to those skilled in the art, the KVM/IP redirection device 114 includes functionality for capturing screen displays generated by the SUT 104, compressing the screen displays, and transmitting the screen displays to the TCS 102. The KVM/IP redirection device 114 also includes functionality for receiving commands from the TCS 102 to provide keyboard or mouse input to the SUT 104. In response to receiving such instructions, the KVM/IP redirection device 114 is configured to provide the specified keyboard or mouse input to the SUT 104. In this manner, the programs described herein as executing on the TCS 102 can receive screens generated by the SUT 104 and provide keyboard and mouse input to the SUT 104. In one embodiment, the KVM/IP redirection device 114 also provides functionality for powering the SUT 104 on and off under the control of the TCS 102. In this embodiment, the power controller 120 may be unnecessary when controlling the SUT.

According to another implementation, a combination of components might be utilized to provide similar functionality to the KVM/IP redirection device 114. For instance, in one embodiment, a Keyboard and Mouse Emulator (not shown) might be utilized to provide keyboard and mouse input to the SUT 104 in response to commands received from the TCS 102. In one implementation, the Keyboard and Mouse Emulator connects to the SUT 104 using a USB interface and connects to the TCS 102 utilizing an RS-232 interface. A Frame Grabber (also not shown in FIG. 1), might also be utilized to capture screen displays from the SUT 104 and to provide the captured screen displays to the TCS 102. The Frame Grabber might connect to video output of the SUT 104, such as a DVI output, and provide the captured screen displays to the TCS 102 via a USB connection. It should be appreciated that other and different arrangements of components might also be utilized to provide the functionality described above.

As briefly described above, the SUT 104 comprises a computer system that includes a firmware 106. As discussed briefly above, the firmware 106 provides functionality for performing a power on self test of the SUT 104, for performing a boot of the SUT 104, for providing interfaces to the low level operation of the SUT 104 to an operating system, and for performing other functions. Because the firmware 106 controls the low level operation of the SUT 104, it is imperative that the firmware 106 operates without program errors. The process described herein for automating the installation of operating systems on the SUT 104 may be utilized to identify errors within the firmware 106. Once such errors have been identified, the firmware 106 can be modified to correct the errors and the processes described herein may be repeated until an error-free installation has been performed.

As will be described in greater detail below, the SUT 104 may include conventional computing components, such as a central processing unit, a memory, and one or more mass storage devices. In one implementation, the SUT 104 is connected to a backplane drive set 116 containing a set of drives, such as hard disk drives. One of the drives in the backplane drive set 116 is activated and connected to the SUT at a time, known as a "working drive," upon which an operating system for use in booting the SUT 104 is installed by the processes presented herein. According to embodiments, one operating system is installed on one drive of the backplane drive set 116 when the drive is activated as the working drive. As a consequence, after the installations of all the operating systems are complete, the backplane drive set 116 stores all the operating systems that have been installed, which may also be utilized to debug the operation of the firmware 106. It should be appreciated that although the backplane drive set 116 has been discussed above as hard disk drives, other types of mass storage devices, such as solid state mass storage devices may be utilized. In one implementation, the backplane driver set 116 may be deployed on the same board as the power controller 120 and the device switch 108.

According to one embodiment, the backplane drive set 116 may be directly controlled by the TCS 102 via a USB connection to select drives to be activated for installation of operating systems by switching serial advanced technology attachment ("SATA") signals utilized for connecting the SUT 104 to the backplane drive set 116. Alternatively, or additionally, a connection (not shown) between the power controller 120 and a backplane drive set 116 may be provided. Through the connection, the power controller 120 can be utilized under the instruction of the TCS 102 to power on or power off drives in the backplane drive set 116 to select the working drive for the SUT.

As will be discussed in greater detail below, the TCS 102 may control an automated installation of an operating system on the SUT 104. In order to facilitate this process, the firmware 106 of the SUT 104 is configured to boot from an external mass storage device. Once the SUT 104 has been so configured, the program code executing on the TCS 102 causes the device switch 108 to connect the mass storage device 110 mounted with a disk image corresponding to a first operating system to the SUT 104. The TCS 102 then activates a first drive in the backplane drive set 116 as the working drive, such as through directly controlling the SATA signals of the backplane drive set 116 or through the use of the power controller 120. The TCS 102 further causes the SUT 104 to power on, for example, through the use of the power controller 120 or the KVM/IP redirection device 114. When the SUT 104 boots up, it executes the installer program for the first operating system contained in the mass storage device 110 to install the first operating system onto the working drive.

While the SUT 104 is installing an operating system, the TCS 102 receives screens generated by the SUT 104 from the KVM/IP redirection device 114. The TCS 102 then compares the screens received from the SUT 104 to previously stored screens generated during an error-free installation of the operating system. Through this comparison process, the TCS 102 can determine if an error has occurred during installation of the operating system on the SUT 104. If an error occurs during the installation, the TCS 102 stores data identifying the error in an error log. A screen display generated by the SUT 104 at or around the time of the error may also be stored by the TCS 102. In one implementation, the TCS 102 can also provide keystrokes to the SUT 104 to facilitate the installation of an operating system. The keystrokes may be provided to the SUT through the use of the KVM/IP redirection device 114 in the manner described above. The TCS 102 may perform an analysis of the screens received from the SUT 104 to determine when a particular key press should be provided to the SUT 104. In a similar fashion, the TCS 102 may provide mouse input to the SUT 104 to control the installation of an operating system.

The TCS 102 also compares screens received from the SUT 104 to previously generated and stored screens to determine if the installation of the operating system on the SUT has completed. If the installation has completed, the TCS 102 causes the SUT 104 to power off through the use of the power controller 120 or the KVM/IP redirection device 114. The TCS 102 also deactivates the working drive in the backplane drive set 116, for example, through the use of the power controller 120 or by switching the SATA signals of the backplane drive set 116. The TCS 102 then causes the device switch 108 to connect the mass storage device 110 to the TCS 102. The TCS 102 then selects and mounts a second disk image containing an installer program for a second operating system to be installed on the SUT 104 onto the mass storage device 110. The TCS 102 then causes the device switch 108 to connect the mass storage device 110 to the SUT 104, connects and activates a second drive in the backplane drive set 116 as the working drive, and monitors the installation of the second operating system on the SUT 104 in a similar manner presented above. This process may then repeat for any number of operating systems, thereby allowing multiple operating systems to be installed on the SUT 104 in an automated fashion. When all of the operating systems have been installed, the TCS 102 may generate a message to an administrator, such as an electronic mail, that includes the error log and screens showing any errors encountered during the installation of any of the operating systems.

According to embodiments, the generated error log, screens, and installed operating systems stored on each drive in the backplane drive set 116 may be utilized to debug the operation of the firmware 106 executing on the SUT 104. For instance, bugs in the firmware 106 may be identified through an analysis of the error log, screens, and operating system installations. Once a bug has been identified, an appropriate bug fix may be applied to the firmware 106. The test described above may then be repeated on the revised firmware to determine if the problem has been resolved.

It should be appreciated that although specific types of connections have been illustrated in FIG. 1 between the various components of the system 100, other types of connections may also be utilized. For instance, USB connections have been illustrated between the device switch 108 and the TCS 102, between the mass storage device 110 and the device switch 108, between the device switch 108 and the SUT 104, and between the TCS and the backplane drive set 116. It should be appreciated that other types of wired or wireless connections suitable for connecting a mass storage device to a computing system may be utilized. Similarly, although SATA interfaces have been illustrated as being utilized for connecting the SUT 104 to the backplane drive set 116, other types of appropriate interfaces for connecting a mass storage device to a computing system may be utilized. It should be appreciated that the embodiments described herein are not limited by the particular interfaces described herein with respect to any embodiment.

Figure 2:
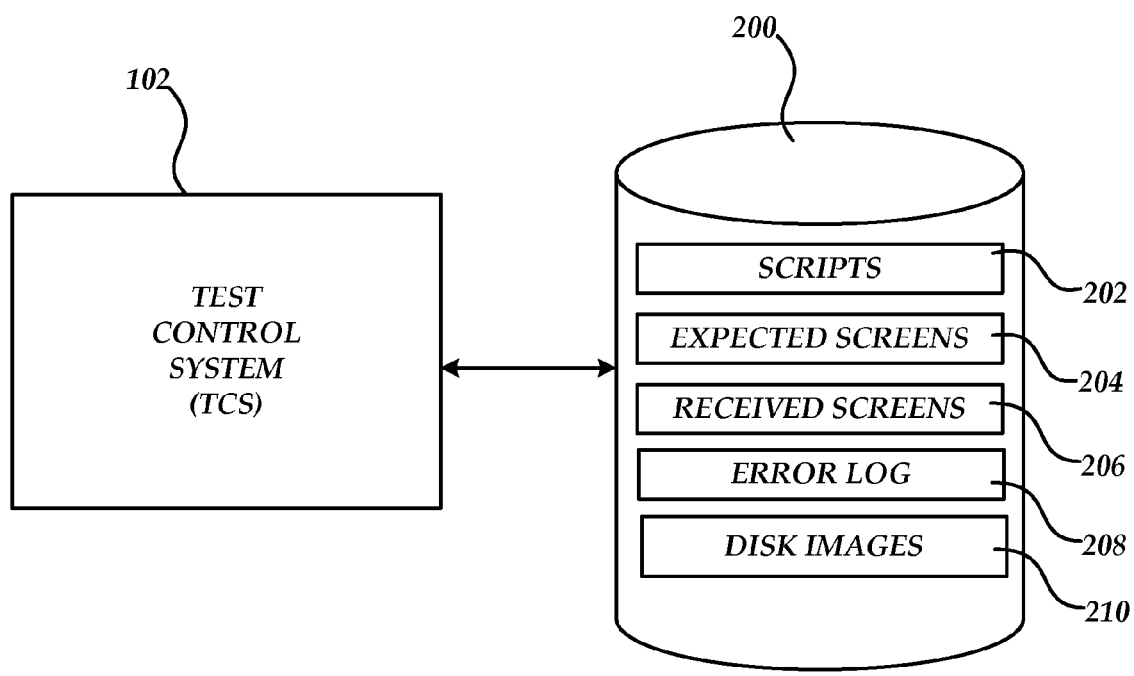
FIG. 2 is a simplified computer system architecture diagram showing aspects of a test control system provided in one embodiment disclosed herein.

FIG. 2 is a simplified computer system architecture diagram showing aspects of a test control system 102 provided in one embodiment disclosed herein. As shown in FIG. 2, the TCS 102 includes a mass storage device 200. The mass storage device 200 is utilized to store an operating system and executable programs for use by the TCS 102 in coordinating the process of automated operating system installation. In particular, in one embodiment, the mass storage device 200 stores scripts 202. The scripts 202 are configured to provide the functionality presented herein for automating the process of installing an operating system on the SUT 104. It should be appreciated that although the embodiments presented herein utilize scripts 202, virtually any type of executable computer program may be configured for providing the functionality described herein. For instance, a standard application program may be programmed for execution on the TCS 102 that provides the functionality described herein.

According to embodiments, the mass storage device 200 also stores the expected screens 204 and received screens 206. The received screens 206 are screen displays generated by the SUT 104 and transmitted to the TCS 102 by the KVM/IP redirection device 114. The expected screens 204 are captured and stored during an error-free installation of an operating system on the SUT 104 or another computer system. As discussed briefly above and in greater detail below, the scripts 202 compare the received screens 206 to the expected screens 204 to determine if an error has occurred during the installation of an operating system on the SUT 104. It should be appreciated that expected screens 204 may be stored for all of the operating systems to be installed on the SUT 104. Additional details regarding this process will be provided below.

According to one implementation, the mass storage device 200 also stores an error log 208. As described briefly above, the scripts 202 store data in the error log 208 in the event that an error is identified during the installation of an operating system on the SUT 104. The data stored in the error log 208 may provide various information such as the kind of error encountered, the time the error was encountered, and other parameters regarding the operating system installation on the SUT 104. As discussed briefly above, the scripts 202 may generate a message, such as an electronic mail message, with the error log 208 to an administrator to notify the administrator that an error has occurred during the installation of an operating system on the SUT 104. The TCS 102 may also make the error log 208 available to the administrator in other ways.

According to embodiments, the mass storage device 200 also stores disk images 210 each containing an installer program for an operating system to be installed on the SUT 104. As discussed above, a disk image 210 is mounted onto the mass storage device 110 when the mass storage device 110 is connected to the TCS 102, making the mass storage device 110 a bootable device from which the SUT 104 may be booted when connected to the mass storage device 110 and properly configured. Additional details regarding the operation of the TCS 102 will be provided below with respect to FIGS. 3-6.

Figure 3:
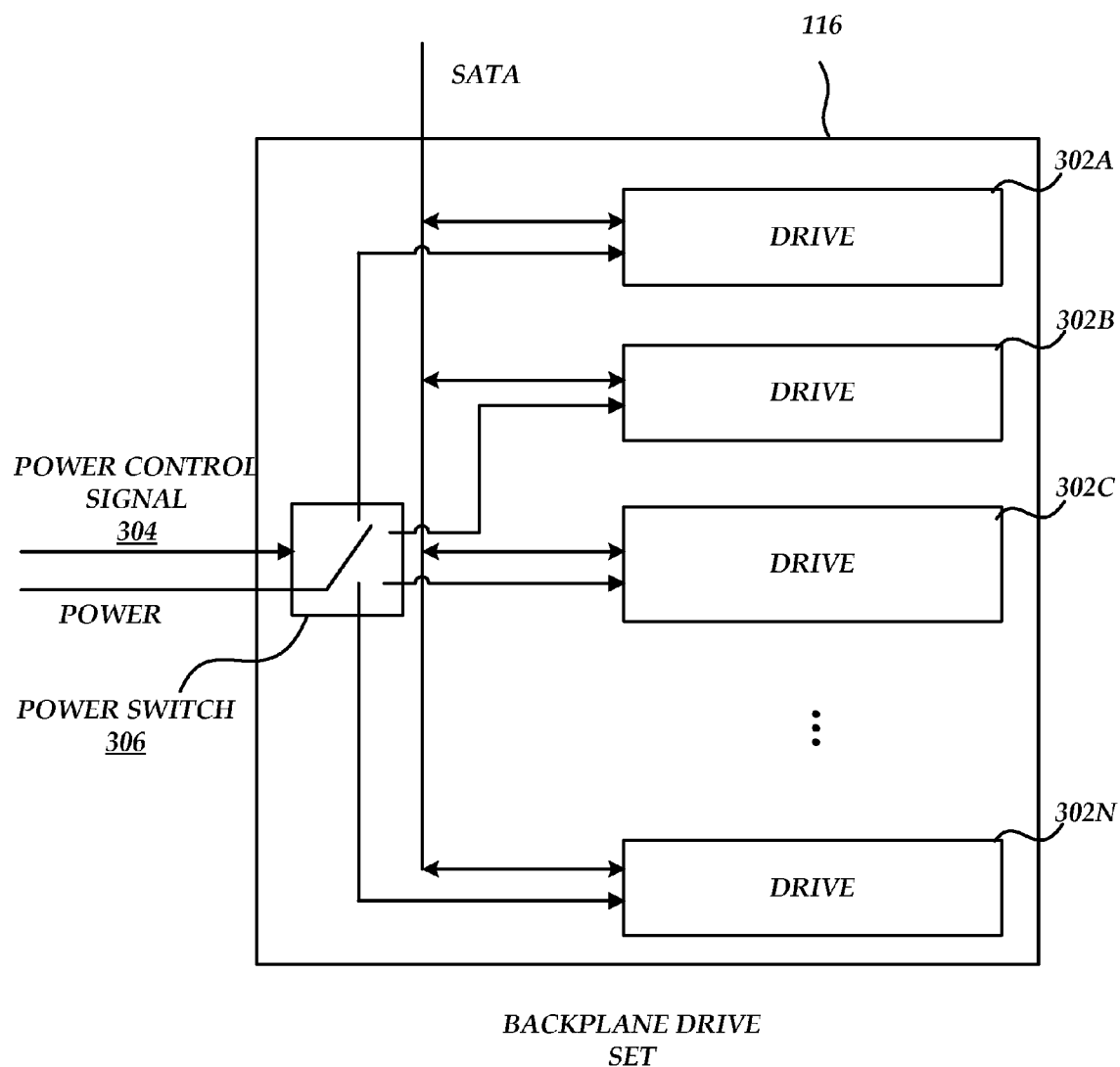
FIG. 3 is a system diagram showing aspects of a backplane drive set utilized in one embodiment presented herein.

FIG. 3 is a system diagram showing aspects of a backplane drive set 116 utilized in one embodiment presented herein. As illustrated in FIG. 3, the backplane drive set 116 includes a number of drives 302A-302N (which may be referred to herein collectively as the drives 302 or individually as drive 302). As discussed above, drives 302A-302N may comprise hard disk drives. In one implementation, one hard disk is utilized as one drive 302. In another implementation, a partition of a hard disk is mapped to a drive 302. According to other embodiments, drives 302A-302N may comprise solid state mass storage devices. Other types of mass storage devices may also be utilized.

According to embodiments, the drives 302A-302N are connected to the SUT 104 through SATA interfaces or other types of appropriate interfaces. At the time when an operating system contained in the mass storage device 110 is installed on the SUT 104, one drive 302 is activated as the working drive so that the operating system can be installed onto the working drive. In one implementation, the activation and deactivation of the drives 302A-302N can be realized by controlling the power of the drives 302A-302N through a power switch 306. The power switch 306 receives a power control signal 304 from the power controller 120 and powers on or off a drive 302 according to the power control signal 304. The power control signal 304 is generated by the power controller 120 under the instruction of the TCS 102 and specifies which one of the drives 302A-302N should be powered on for activation or be powered off for deactivation. To the SUT 104, only the activated drive, or the working drive, will be identified as an available drive for the installation of an operating system.

In another implementation, the selection of working drive from the drives 302A-302N in the backplane drive set 116 may be realized by switching the SATA signals following instructions from the TCS 102. In this implementation, the power control signal 304 shown in FIG. 3 may be replaced with a drive control signal (not shown) sent from the TCS 102, and the power switch 306 illustrated in FIG. 3 may be replaced with a SATA signal switch (not shown). The SATA signal switch may be utilized to connect one of the drives 302A-302N in the backplane drive set 116 to the SUT under the control of the drive control signal to activate the drive for the SUT, and to disconnect the drive from the SUT to deactivate the driver. In this scenario, drives 302A-302N may be supplied with power all the time. Similarly, to the SUT 104, only the drive connected to the SUT will be identified as the activated drive, or the working drive, available for the installation of an operating system.

Figure 4A:
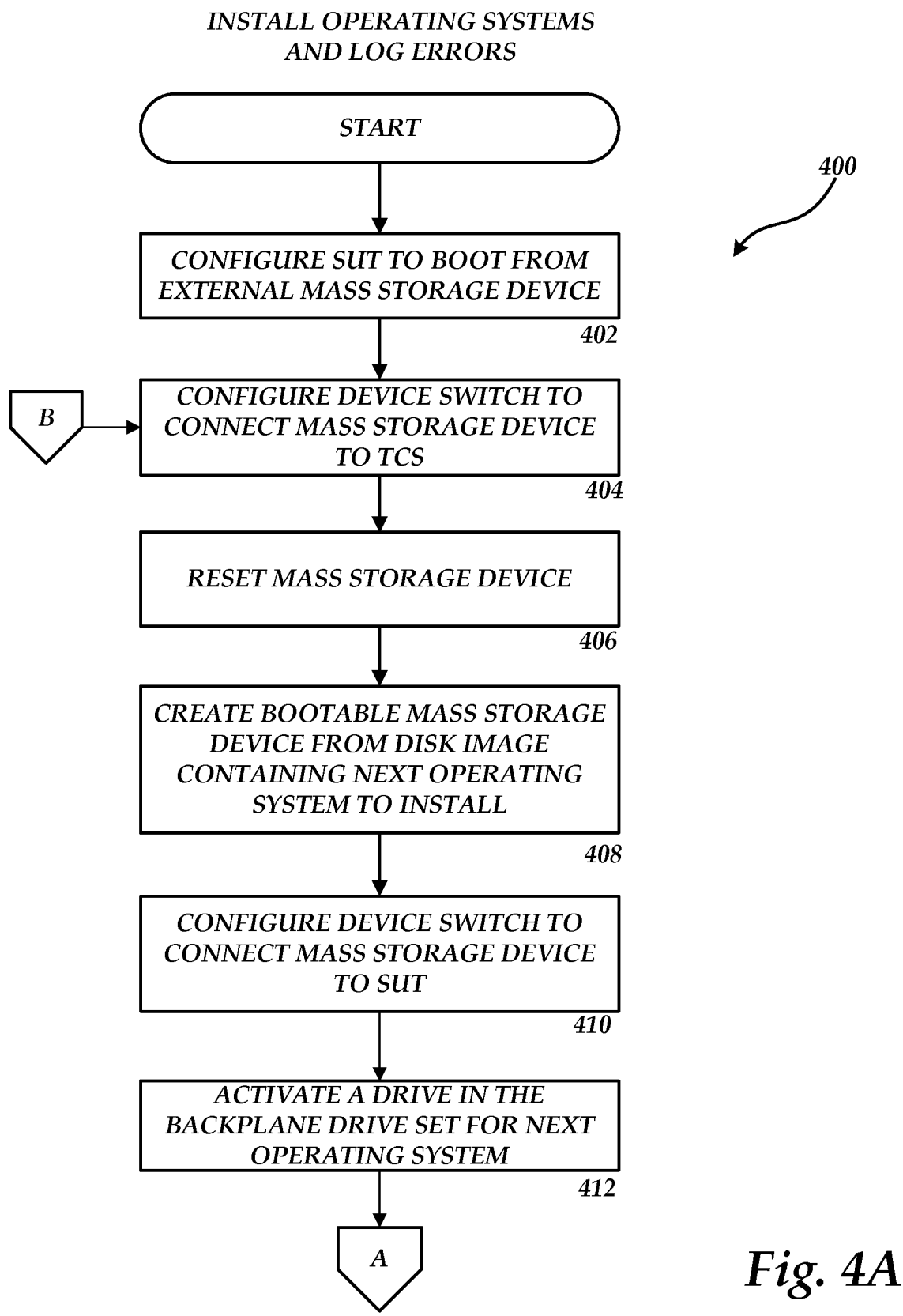
FIGS. 4A and 4B are flow diagrams showing aspects of one process presented herein in an embodiment for the automated installation of operating systems.
Figure 4B:
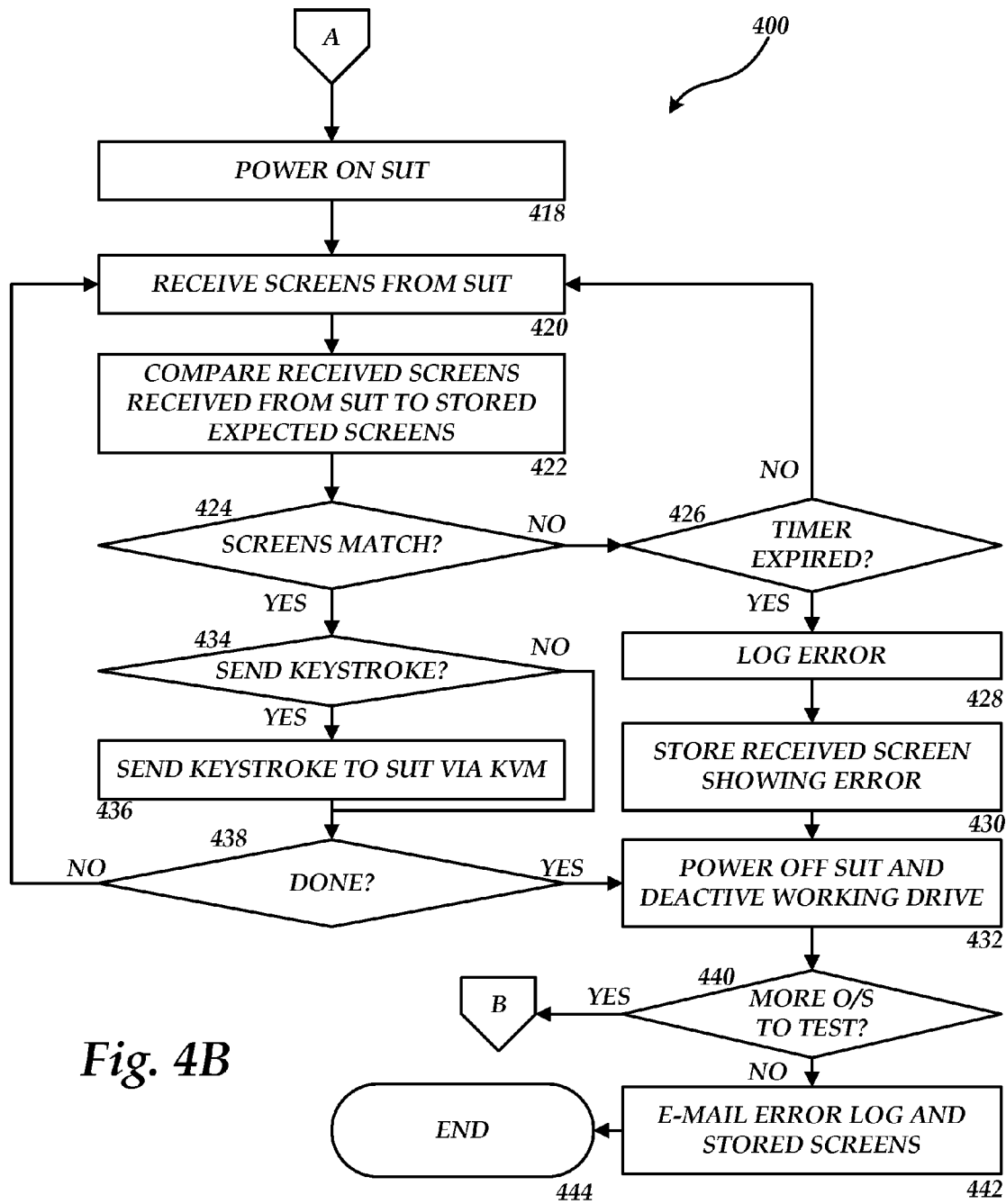

FIGS. 4A and 4B are flow diagrams showing aspects of one process presented herein in an embodiment for the automated installation of operating systems. It should be appreciated that the logical operations described herein with respect to the various figures are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 400 begins at operation 402, where the SUT 104 is configured to boot from an external the mass storage device 110. From operation 402, the routine 400 proceeds to operation 404, where the TCS 102 configures the device switch 108 to connect the mass storage device 110 to the TCS 102. Once the mass storage device 110 is connected to the TCS 102, the routine 400 proceeds to operation 406 wherein the TCS 102 may prepare the mass storage device 110 for mounting of a disk image by, for example, resetting or reformatting the mass storage device 110 if necessary. The routine 400 then proceeds to operation 408, wherein the TCS 102 creates a bootable mass storage device 110 from a disk image containing an installer program of an operating system to be installed on the SUT 104. Specifically, the TCS 102 mounts the disk image onto the mass storage device 110 and configures the mass storage device 110 as a bootable device.

Once the bootable mass storage device 110 has been created, the routine 400 proceeds to operation 410 wherein the TCS 102 configures the device switch 108 to connect the mass storage device 110 to the SUT 104, and further proceeds to operation 412 wherein the TCS 102 activates a drive 302 in the backplane drive set 116 that has not been installed with any operating system as a working drive available to the SUT 104. As discussed above, the TCS 102 may utilize the power controller 120 and the power switch 306 to activate the drive 302 by powering on the drive 302. Alternatively, the TCS 102 may directly control a SATA signal switch to select the drive 302 to be activated and connected to the SUT 104.

The routine 400 then proceeds to operation 418 wherein the TCS 102 powers on the SUT 104. According to various embodiments, the TCS 102 may utilize the power controller 120 or the KVM/IP redirection device 114 to power on the SUT 104. In response to being powered on, the SUT 104 will boot from the mass storage device 110, begin executing the operating system installer program from the mass storage device 110 and begin the process of installing the next operating system onto the working drive connected to the SUT 104. During the installation of the operating system, the KVM/IP redirection device 114 will receive screens from the SUT 104 and transmit the screens to the TCS 102. The TCS 102 receives the screens from the KVM/IP redirection device 114 at operation 420. From operation 420, the routine 400 proceeds to operation 422 where the TCS 102 compares the screens 206 received from the KVM/IP redirection device 114 to the expected screens 204.

At operation 424, a determination is made if the expected screens 204 match the received screens 206. If not, the routine 400 proceeds to operation 426, where the TCS 102 determines whether a timer has expired. If not, the routine 400 returns to operation 420 where an additional determination is made. The use of a timer in this manner allows the TCS 102 to wait a predetermined period of time before concluding that an error has occurred during the installation of an operating system on the SUT 104. This can be utilized to account for timing differences in the speed at which an operating system may be installed on different systems having varying level of performance.

If the timer has expired at operation 426, the routine 400 proceeds to operation 428 where the TCS 102 makes a record of the error in the error log 208 in the manner described above. The routine 400 then proceeds to operation 430 where the TCS 102 stores the received screen 206 showing the error in the installation of the operating system on the SUT 104.

If, at operation 424, the scripts 202 executing on the TCS 102 determine that the expected screens 204 match the received screens 206, the routine 400 proceeds from operation 424 to operation 434. At operation 434, the scripts 202 determine whether one or more keystrokes should be sent to the SUT 104 in order to facilitate the installation of the operating system on the SUT 104. If no keystrokes are to be sent to the SUT 104, the routine 400 proceeds from operation 434 to operation 438. If keystrokes are to be sent to the SUT 104, the routine 400 proceeds from operation 434 to operation 436 where the TCS 102 sends the appropriate keystrokes to the KVM/IP redirection device 114 for provision to the SUT 104. It should be appreciated that the keystrokes to be sent to the SUT 104 may be determined through an analysis of an error-free installation of an operating system on the SUT 104. It should also be appreciated that mouse input may be transmitted to the SUT 104 in a similar manner to facilitate installation of an operating system on the SUT 104.

From operation 436, the routine 400 proceeds to operation 438 where the scripts 202 determine whether the installation of the operating system on the SUT 104 has completed. This may be accomplished, for instance, by comparing the expected screens 204 to the received screens 206 to determine whether the installation has completed. For instance, the expected screens 204 may show a final screen in an operating system installation, such as an operating system desktop. If the received screens 206 match such an expected screen 204, the routine 400 proceeds from operation 438 to operation 432. If the operating system installation has not completed, the routine 400 proceeds from operation 438 to operation 420, described above.

At operation 432, the TCS 102 causes the SUT 104 to be powered off and deactivates the working drive, such as by powering off the working drive or by disconnecting the working drive from the SUT 104. The routine 400 then proceeds to operation 440 where the scripts 202 determine whether additional operating systems remain to be installed on the SUT 104. If so, the routine 400 proceeds to operation 404 described above for the installation of additional operating systems. If no more additional operating systems remain to be installed, the routine 400 proceeds from operation 440 to operation 442.

At operation 442, the scripts 202 cause the TCS 102 to email the error log 208 and any stored screens showing errors during the installation of operating systems on the SUT 104 to a system administrator. As discussed above, the TCS 102 may also make the error log 208 and the screens showing installation errors available to an administrator in another fashion. From operation 442, the routine 400 proceeds to operation 444, where it ends.

It should be appreciated that, according to embodiments, the scripts 202 may be configured to flash the firmware 106 as part of the operating system installation process described above. For instance, if errors are encountered during the installation of an operating system 104 on the SUT 104, the scripts 202 may cause a different version of the firmware 106 to be installed on the SUT 104. The scripts 202 may then attempt another installation of the same operating system under SUT 104. In this manner, different versions of the firmware 106 can be tested with an installation of the same or different operating systems. It should also be appreciated that the operations described above with respect to FIGS. 4A-4B may be performed in a different order, additional operations might be performed, and some illustrated and described operations might not be performed.

Figure 5:
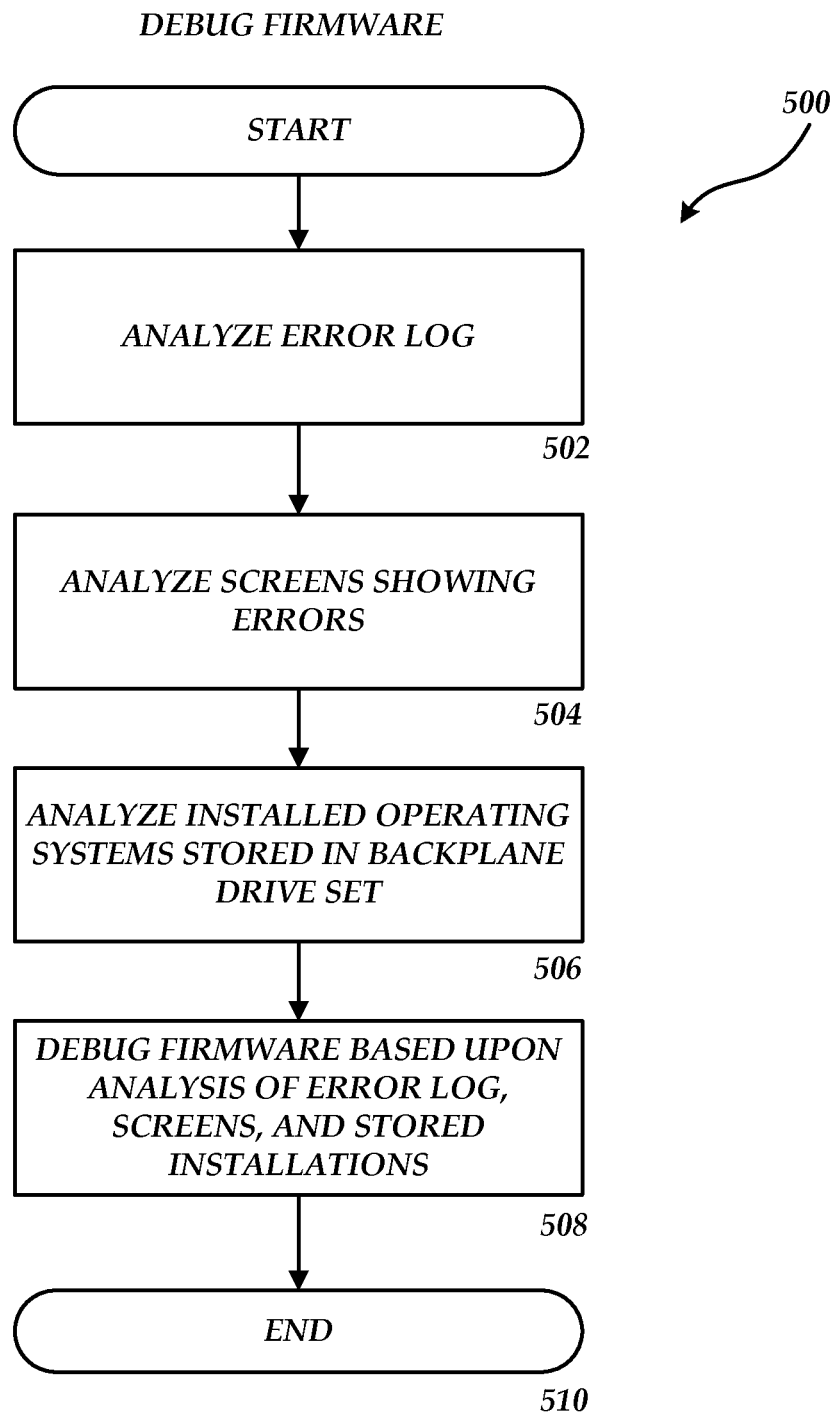
FIG. 5 is a flow diagram showing aspects of a process presented herein in one embodiment for debugging the operation of a computing system firmware that utilizes automated operating system installation.

FIG. 5 is a flow diagram showing aspects of a routine 500 presented herein in one embodiment for debugging the operation of a computing system firmware 106 that utilizes automated operating system installation. The routine 500 begins at operation 502, where the error log 208 is analyzed to identify errors within the firmware 106. The routine then proceeds to operation 504, where the screens captured by the KVM/IP redirection device 114 at or around the time of an error during the installation of an operating system on the SUT 104 are also analyzed in attempt to identify errors within the firmware 106.

From operation 504, the routine 500 proceeds to operation 506, where the operating system installations stored on the drives 302 of the backplane drive set 116 are analyzed in an attempt to identify errors within the firmware 106. If errors are identified at any of the operations 502, 504, or 506, described above, the routine 500 proceeds to operation 508 where the firmware 106 is modified in an attempt to eliminate the error within the firmware 106. As discussed briefly above, the processes described above for automated operating system installation may be repeated following a modification of the firmware 106 in order to determine whether the identified error has been eliminated from the firmware 106. From operation 508, the routine 500 proceeds to operation 510, where it ends.

Figure 6:
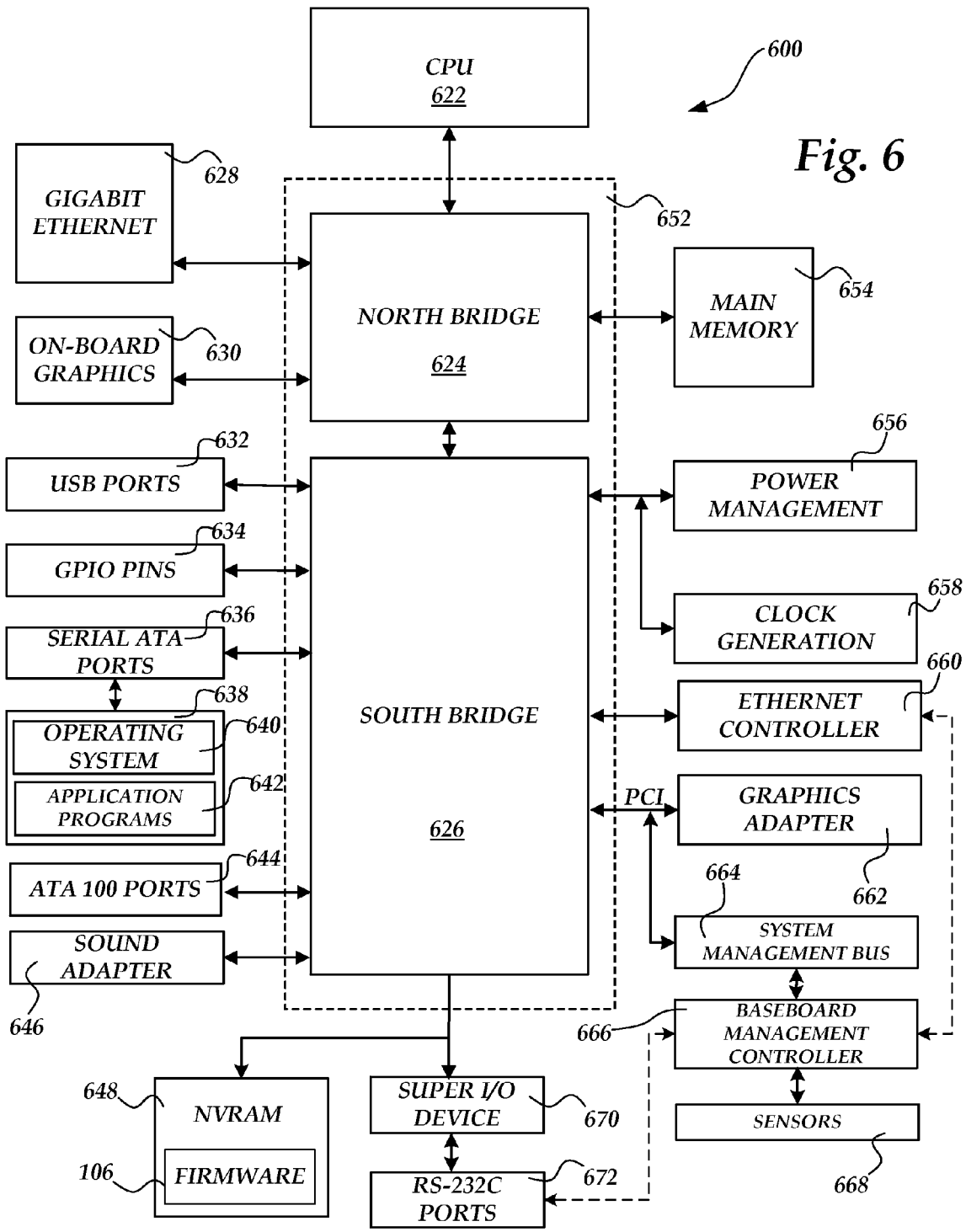
FIG. 6 is a computer architecture diagram showing an illustrative computer architecture that might be utilized to implement the various computing systems presented herein.

FIG. 6 is a computer architecture diagram showing an illustrative computer architecture that might be utilized to implement the various computing systems presented herein. FIG. 6 and the following discussion are intended to provide a brief, general description of one suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, scripts, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

As discussed briefly above, FIG. 6 shows an illustrative computer architecture that may be utilized to embody the various computing systems described herein. It should be appreciated that the computer architecture shown in FIG. 6 may be utilized to embody the TCS 102 or the SUT 104. The illustrative computer architecture shown in FIG. 6 is for a computer 600 that includes a baseboard, or "motherboard", which is a printed circuit board to which a multitude of components or devices may be connected by way of a system bus or other electrical communication path. In one illustrative embodiment, a CPU 622 operates in conjunction with a chipset 652. The CPU 622 is a central processor that performs arithmetic and logical operations necessary for the operation of the computer. The computer 600 may include a multitude of CPUs 622.

The chipset 652 includes a north bridge 624 and a south bridge 626. The north bridge 624 provides an interface between the CPU 622 and the remainder of the computer 600. The north bridge 624 also provides an interface to a random access memory ("RAM") used as the main memory 654 in the computer 600 and, possibly, to an on-board graphics adapter 630. The north bridge 624 may also include functionality for providing networking functionality through a gigabit Ethernet adapter 628. The gigabit Ethernet adapter 628 is capable of connecting the computer 600 to another computer via a network. Connections that may be made by the network adapter 628 may include LAN or WAN connections. LAN and WAN networking environments are commonplace in offices, enterprise-wide computer networks, intranets, and the Internet. The north bridge 624 is connected to the south bridge 626.

The south bridge 626 is responsible for controlling many of the input/output functions of the computer 600. In particular, the south bridge 626 may provide one or more universal serial bus ("USB") ports 632, a sound adapter 646, an Ethernet controller 660, and one or more general-purpose input/output ("GPIO") pins 634. The south bridge 626 may also provide a bus for interfacing peripheral card devices such as a graphics adapter 662. In one embodiment, the bus comprises a peripheral component interconnect ("PCI") bus. The south bridge 626 may also provide a system management bus 664 for use in managing the various components of the computer 600. Additional details regarding the operation of the system management bus 664 and its connected components are provided below.

The south bridge 626 is also configured to provide one or more interfaces for connecting mass storage devices to the computer 600. For instance, according to an embodiment, the south bridge 626 includes a serial advanced technology attachment ("SATA") adapter for providing one or more serial ATA ports 636 and an ATA 100 adapter for providing one or more ATA 100 ports 644. The serial ATA ports 636 and the ATA 100 ports 644 may be, in turn, connected to one or more mass storage devices storing an operating system 640 and application programs 642, such as the SATA disk drive 638. As known to those skilled in the art, an operating system 640 comprises a set of programs that control operations of a computer and allocation of resources. An application program is software that runs on top of the operating system software, or other runtime environment, and uses computer resources to perform application specific tasks desired by the user.

The mass storage devices connected to the south bridge 626, and their associated computer-readable media, provide non-volatile storage for the computer 600. Although the description of computer-readable media contained herein refers to a mass storage device, such as a hard disk or CD-ROM drive, it should be appreciated by those skilled in the art that computer-readable media can be any available media that can be accessed by the computer 600. By way of example, and not limitation, computer-readable media includes volatile and non-volatile, removable and non-removable media implemented in any method or technology for storage of information such as computer-readable instructions, data structures, program modules or other data. For instance, computer-readable media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information in a non-transitory fashion and which can be accessed by the computer 600.

A low pin count ("LPC") interface may also be provided by the south bridge 626 for connecting a "Super I/O" device 670. The Super I/O device 670 is responsible for providing a number of input/output ports, including a keyboard port, a mouse port, a serial interface 672, a parallel port, and other types of input/output ports. The LPC interface may also connect a computer-readable media such as a ROM or a flash memory such as the NVRAM 648 for storing a firmware 106 that includes program code containing the basic routines that help to start up the computer 600 and for transferring information between elements within the computer 600.

As described briefly above, the south bridge 626 may include a system management bus 664. The system management bus 664 may include a baseboard management controller ("BMC") 666. In general, the BMC 666 is a microcontroller that monitors operation of the computer system 600. In a more specific embodiment, the BMC 666 monitors health-related aspects associated with the computer system 600, such as, but not limited to, the temperature of one or more components of the computer system 600, speed of rotational components (e.g., spindle motor, CPU Fan, etc.) within the system, the voltage across or applied to one or more components within the system 600, and the available or used capacity of memory devices within the system 600. To accomplish these monitoring functions, the BMC 666 is communicatively connected to one or more components by way of the management bus 664. In an embodiment, these components include sensor devices for measuring various operating and performance-related parameters within the computer system 600.

The management bus 664 is used by the BMC 666 to request and/or receive various operating and performance-related parameters from one or more components, which are also communicatively connected to the management bus 664. For instance, in one embodiment, the management bus 664 may communicatively connect the BMC 666 to a CPU temperature sensor and a CPU fan (not shown in FIG. 6), thereby providing a means for the BMC 666 to monitor and/or control operation of these components. The BMC 666 may also include sensors 668 connected directly thereto.

The serial ports 672 and the Ethernet controller 660 may be utilized to establish a connection with the BMC 666. Through the use of the BMC 666, the sensors 668, and the system management bus 664, the computer 600 may collect the management data 112 discussed above and make this data available to requesting programs. The BMC 666 may also provide functionality for setting aspects of the management data 112 as discussed above, such as for instance resetting the computer 600 or setting the power state of the computer 600.

It should be appreciated that the software components described herein may, when loaded into the CPU 622 and executed, transform the CPU 622 and the overall computer 600 from a general-purpose computing system into a special-purpose computing system customized to facilitate the functionality presented herein. The CPU 622 may be constructed from any number of transistors or other discrete circuit elements, which may individually or collectively assume any number of states. More specifically, the CPU 622 may operate as a finite-state machine, in response to executable instructions contained within the software modules disclosed herein. These computer-executable instructions may transform the CPU 622 by specifying how the CPU 622 transitions between states, thereby transforming the transistors or other discrete hardware elements constituting the CPU 622.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the computer 600 may comprise other types of computing devices, including hand-held computers, embedded computer systems, personal digital assistants, and other types of computing devices known to those skilled in the art. It is also contemplated that the computer 600 may not include all of the components shown in FIG. 6, may include other components that are not explicitly shown in FIG. 6, or may utilize an architecture completely different than that shown in FIG. 6.

Based on the foregoing, it should be appreciated that concepts and technologies for automated operating system installation have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for automated operating system installation, the method comprising performing computer-implemented operations for:
   causing a device switch to connect a mass storage device to a test control system ("TCS");
   mounting a first disk image containing an installer program for a first operating system onto the mass storage device;
   causing the device switch to connect the mass storage device to a system under test ("SUT");
   activating a first physical drive for the SUT;
   causing the SUT to power on, to boot from the mass storage device, and to execute the installer program for the first operating system to install the first operating system on the first physical drive for the SUT;
   determining that the installer program for the first operating system has completed installation of the first operating system; and
   in response to determining that the installer program for the first operating system has completed installation of the first operating system, causing the SUT to power off, and deactivating the first physical drive.

2. The computer-implemented method of claim 1, further comprising:
   determining that another operating system is to be installed on the SUT; and
   in response to determining that another operating system is to be installed on the SUT,
      causing the device switch to connect the mass storage device to the TCS,
      mounting a second disk image containing an installer program for a second operating system onto the mass storage device,
      causing the device switch to connect the mass storage device to the SUT,
      activating a second drive for the SUT, and
      causing the SUT to power on, to boot from the mass storage device, and to execute the installer program for the second operating system to install the second operating system on the second drive for the SUT.

3. The computer-implemented method of claim 1, wherein activating the first physical drive for the SUT comprises powering on a physical drive connected to the SUT, and wherein deactivating the first physical drive comprises powering off the first physical drive.

4. The computer-implemented method of claim 1, wherein activating the first physical drive for the SUT comprises connecting the first physical drive to the SUT, and wherein deactivating the first physical drive comprises disconnecting the first physical drive from the SUT.

5. The computer-implemented method of claim 1, wherein the first disk image is an ISO image file.

6. The computer-implemented method of claim 1, further comprising:
   receiving a plurality of screen displays generated by the SUT;
   comparing the plurality of screen displays received from the SUT to previously generated and stored screen displays to determine that an error has occurred during the execution of the installer program for the first operating system; and
   in response to determining that an error has occurred during the execution of the installer program for the first operating system, storing data identifying the error in an error log.

7. The computer-implemented method of claim 6, wherein determining that the installer program for the first operating system has completed installation of the first operating system comprises comparing the plurality of screen displays received from the SUT to the previously generated and stored screen displays.

8. The computer-implemented method of claim 7, wherein the previously generated and stored screen displays comprise screen displays of an error-free operating system installation.

9. The computer-implemented method of claim 1, further comprising:
   during the installation of the first operating system, determining that a keystroke should be provided to the SUT to facilitate installation of the first operating system; and
   in response to determining that a keystroke should be provided, causing the keystroke to be provided to the SUT.

10. A system for automated operating system installation, the system comprising:
   a device switch; and
   a test control system ("TCS") coupled to the device switch, the device switch configured to enable connection of a mass storage device to one of the TCS or a system under test ("SUT") at a time, the TCS configured to
      cause the device switch to connect the mass storage device to the TCS,
      mount a first disk image containing an installer program for a first operating system onto the mass storage device,
      cause the device switch to connect the mass storage device to the SUT,
      cause the SUT to power on, to boot from the mass storage device, and to execute the installer program for the first operating system,
      determine that the installer program for the first operating system has completed installation of the first operating system on the SUT, and
      in response to determining that the installer program for the first operating system has completed installation of the first operating system on the SUT, cause the SUT to power off.

11. The system of claim 10, wherein the TCS is further configured to:
   prior to executing the installer program for the first operating system, activate a first physical drive for the SUT, wherein the installer program for the first operating system installs the first operating system on the first physical drive for the SUT; and
   in response to determining that the installer program for the first operating system has completed installation of the first operating system, to deactivate the first physical drive.

12. The system of claim 11, wherein activating the first physical drive for the SUT comprises connecting the first physical drive to the SUT.

13. The system of claim 11, wherein the TCS is further configured to:
   cause the device switch to connect the mass storage device to the TCS;
   mount a second disk image containing an installer program for a second operating system onto the mass storage device;
   cause the device switch to connect the mass storage device to the SUT; and
   cause the SUT to power on, to boot from the mass storage device, and execute the installer program for the second operating system.

14. The system of claim 13, wherein the TCS is further configured to:
   prior to executing the installer program for the second operating system, activate a second physical drive for the SUT, wherein the installer program for the second operating system installs the second operating system on the second physical drive for the SUT.

15. The system of claim 10, wherein the TCS is further configured to:
   receive a plurality of screen displays generated by the SUT;
   compare the plurality of screen displays received from the SUT to previously generated and stored screen displays to determine that an error has occurred during the execution of the installer program for the first operating system; and
   store data identifying the error in an error log in response to determining that an error has occurred during the execution of the installer program for the first operating system.

16. The system of claim 15, wherein determining that the installer program for the first operating system has completed installation of the first operating system comprises comparing the plurality of screen displays received from the SUT to the previously generated and stored screen displays.

17. An apparatus, comprising:
   a processor; and
   a computer-readable storage medium having computer-executable instructions stored thereupon which, when executed by the processor, cause the apparatus to:
      cause a device switch to connect a mass storage device to a test control system ("TCS");
      mount a first disk image containing an installer program for a first operating system onto the mass storage device;
      cause the device switch to connect the mass storage device to a system under test ("SUT");
      activate a first physical drive for the SUT;
      cause the SUT to power on, to boot from the mass storage device, and to execute the installer program for the first operating system to install the first operating system on the first physical drive for the SUT;
      determine that the installer program for the first operating system has completed installation of the first operating system; and
      in response to determining that the installer program for the first operating system has completed installation of the first operating system, cause the SUT to power off, and deactivate the first physical drive.

18. The apparatus of claim 17, wherein the computer-readable storage medium comprises further computer-executable instructions which, when executed by the processor, cause the apparatus to:
   determine that another operating system is to be installed on the SUT; and
   in response to determining that another operating system is to be installed on the SUT,
      cause the device switch to connect the mass storage device to the TCS, mount a second disk image containing an installer program for a second operating system onto the mass storage device,
      cause the device switch to connect the mass storage device to the SUT,
      activate a second drive for the SUT, and
      cause the SUT to power on, to boot from the mass storage device, and to execute the installer program for the second operating system to install the second operating system on the second drive for the SUT.

19. The apparatus of claim 17, wherein activating the first physical drive for the SUT comprises connecting the first physical drive to the SUT, and wherein deactivating the first physical drive comprises disconnecting the first physical drive from the SUT.

20. The apparatus of claim 17, wherein activating the first physical drive for the SUT comprises powering on a physical drive connected to the SUT, and wherein deactivating the first physical drive comprises powering off the physical drive.

\* \* \* \* \*